United States Patent Office 3,197,459
Patented July 27, 1965

3,197,459
PROCESSES FOR MAKING POWDERED OR GRANULAR SUBSTANCES FROM SEAWEED BY ALKALINE DIGESTION
Cyril Wilfred Bonniksen, Drayton St. Leonard, Oxford, England, assignor to Grebon Holdings Limited, Drayton, St. Leonard, Oxford, England, a British company
No Drawing. Filed Dec. 4, 1961, Ser. No. 157,010
7 Claims. (Cl. 260—209.6)

It is well known that the brown sea-weeds (e.g., Ascophylum nodosum and Laminariacae) when digested with mild alkalis, which at the same time precipitate an insoluble calcium salt from a solution of a soluble calcium salt (i.e., sodium carbonate, trisodium phosphate), break up and lose their natural structure and form a viscous magma of highly swollen but water insoluble material dispersed in a solution of sodium alginate. The weed may be so treated at ordinary or elevated temperatures.

It is the object of this invention to provide a method of digesting the brown sea-weeds with mild alkalis without at any time producing a viscous magma to any substantial extent. It is another object of the invention to produce in granular form a dry powder from the digested seaweeds which, on the addition of water, swells and ultimately disperses to form the magma above described.

The present invention is characterised in that borax (or an alkali salt derived from boric acid) is added to the sea-weed prior to the sea-weed being digested with an alkali.

Preferably the sea-weed is made into a dry meal and sufficient water is added to moisten the meal and thereafter the borax or said alkali salt is introduced to the moist meal so that the meal remains free flowing throughout the reaction.

The quantity of borax or alkali salt which is added is variable being dependent in part upon the amount of water which is used. While there is apparently no upper limit to the quantity of borax or alkali salt—and therefore this amount will be determined by considerations other than those directly arising from the process—the lower limit is about 0.1% of the weight of the final product. As the moisture content increases a greater quantity of borax is required. It is generally preferred to keep the moisture content low and to use a correspondingly low quantity of borax.

In practice the fresh brown weed is thoroughly dried in a current of warm air until it becomes brittle and is then reduced to a fine meal by milling. The dried meal is placed in a mixing device and a quantity of water is added, up to no more than 50% of the weight of the meal taken and preferably about 30%, while the dry meal is being agitated. Borax is added while agitation is continuing a suitable quantity being 1% of the meal taken. Thereafter the alkali is introduced and this mixture, while maintained in a state of agitation by the mixing device is heated (e.g., to a temperature not exceeding 100° centigrade) and maintained in heated condition—with or without agitation—for several hours, for example about four hours. Throughout this time the meal will have retained its mechanical form the particles at no time becoming sticky. The mixture is now cooled to produce a powder which possesses the property of swelling and ultimately dispersing in water. If the operations described were to be carried out without the addition of borax, the particles adhere and the mixture becomes sticky, this effect becoming more marked the greater the amount of water added.

Examples of the process of this invention (which are given by way of illustration only) are as follows:

*Example I*

(a) 100 lbs. of Ascophylum nodosum meal prepared as mentioned above is placed in a mixing device, (b) 20 lbs. of water is added to the meal, preferably as a spray, and thoroughly mixed in to moisten the meal, and (c) 1 lb. of powdered borax is added to the moist meal followed by 30 lbs. of sodium carbonate.

The mixture so produced is heated to 80° centigrade and held at this temperature for four hours when it is allowed to cool to produce a powder.

*Example II*

(a) 100 lbs. of Ascophylum nodosum meal prepared as mentioned above is placed in a mixing device, (b) 50 lbs. of water is added to the meal, preferably as a spray, and thoroughly mixed in to moisten the meal, and (c) 2 lbs. of powdered borax is added to the moist meal followed by 30 lbs. of sodium carbonate.

The mixture so produced is heated to 35° centigrade and held at this temperature for twenty-four hours when it is allowed to cool to produce a powder.

The proportions of the ingredients, meal, water, borax and alkali vary from species to species of weed, and even with the same species it may be desirable to vary the proportions to produce special effects. However, within wide variations in the proportions of these ingredients it has been found that the presence of a small amount of borax will ensure that the powder remains free-flowing throughout the process. The same result is obtained with wide variations in the temperature. This is important because it is sometimes convenient to work at 40° C., for example, rather than 80° C. or thereabouts (compare Examples I and II above). The reaction exhibits the usual change of rate with temperature so that if a low temperature be chosen the mixture must be held at this temperature for a longer time.

The use of borax in the manner described ensures the free flowing characteristics of the mixture throughout the reaction. It has been stated above that there is a lower limit to the amount of borax which must be used to achieve the desired result and that the amount required increases as the moisture content of the powder increases. Thus, 1% of borax is sufficient if the final moisture content of the powder does not exceed 20% while about 2% must be used if the final moisture content of the powder rises to 70%. Proportionate amounts between these two would of course be used for intermediate moisture contents. The percentages of both water and borax refer to the finished products the powder produced after cooling the mixture.

As borax is also a preservative it is permissible by the present process to increase the moisture content of the powder beyond values which would be objectionable because the sea-weed would tend to mildew and to rot.

The powder produced by this process has many uses and the invention is not limited to any particular use. Several such uses will now be referred to.

The powder may be broadcast or otherwise used on the soil, more especially where intensive cultivation prevails, e.g., horticultural land, glasshouses, and so on. The powder can be added in quite small quantities, for example, as little as 0.05% of the soil by weight. The powder is applied "dry," that is, with the moisture content indicated above. The granules or particles of the powder absorb moisture from the soil and from rainfall and consequently swell and become jelly-like, retaining the moisture. The water so retained is available finely dispersed throughout the soil and is a relatively large source of oxygen for the rootlet hairs. Soil by itself does not usually retain enough water to provide an adequate supply of oxygen. The powder of this invention is beneficial in this respect. Another advantage of the powder as a soil conditioner in the manner described is that oxygen diffuses through the jelly globules at about the same rate as through water.

Bonding agents (e.g., soluble gelatine) are well known for use in sands for the casting of alloys and special steels, moulds being prepared from the sands. A powder made according to this invention may be used as a bonding agent the powder having considerably greater bonding power than starch and less charring of the mould occurs so that there is less pitting of the mould with a better surface finish of the casting.

The bonding agent referred to in the previous paragraph is preferably made as follows:

(a) Milled dried sea-weed is washed until free from mineral salts, (b) The swollen particles are introduced to a mixing device and borax up to 2% of the original weight of the dried, milled sea-weed is added, and (c) Sodium carbonate is added in weight equal to one-third of the dried, milled sea-weed.

The resulting powder produced is of dry appearance and can be used as a bonding agent upon admixture with sand. It is preferred that the powder be used by adding water thereto to produce a demineralised viscous magma and finely divided sand is added thereto until its weight exceeds that of the weight of the weed treated as at (a) above taken about 50 times. The consistency (and mouldability) of the product so obtained may be varied either by the addition of more water or by the addition of a more concentrated magma.

The de-mineralised viscous magma produced as just described may be introduced to the stream of water used to disperse drilling mud, e.g., in oil-well drilling to reduce sedimentation of the water-mud stream in the well bore.

The powder produced by the first process described above may be used as a dispersing agent, e.g., in the paint industry as, for instance, to disperse bitumen in the manufacture of bitumastic paints.

I claim:

1. A method of digesting brown sea-weed which comprises drying the weed, reducing the dried weed to a fine meal in dry state, moistening the meal with water, adding an alkali metal borate in a quantity being at least 0.1% of the weight of the final product, and digesting the weed with a mild alkali selected from the group consisting of sodium carbonate and trisodium phosphate in the presence of said alkali metal borate and at a temperature not exceeding 100° centigrade, the water being added to an amount not more than 50% of the weight of the dry meal but enough to ensure penetration of the weed particles by said mild alkali to effect digesting but insufficient to destroy the non-viscous free flowing form of the final product.

2. A method according to claim 1 wherein the weed is digested in the presence of said borate at a temperature between 35° and 80° centigrade.

3. A method according to claim 2 wherein the weed is digested for a time from four to twenty-four hours.

4. A method according to claim 1 wherein the water is added to an amount not more than 30% of the weight of the meal.

5. A method according to claim 1 wherein said borate is added in a quantity being about 1 to 2% of the weight of the dry weed meal.

6. A method of digesting brown sea-weed which comprises drying the weed until brittle, reducing the dried weed to a fine meal in dry state, moistening the meal with water added to an amount about 20% of the weight of the dry meal, adding borax in a quantity being about 1% of the weight of the dry meal, and digesting the weed with sodium carbonate in a quantity about 30% of the weight of the dry meal, the mixture being heated to about 80° centigrade and held at such temperature for about four hours and thereafter cooled to produce as final product a free flowing powder.

7. A method of digesting brown sea-weed which comprises drying the weed until brittle, reducing the dried weed to a fine meal in dry state, moistening the meal with water added to an amount about 50% of the weight of the dry meal, adding borax in a quantity being about 2% of the weight of the dry meal, and digesting the weed with sodium carbonate in a quantity about 30% of the weight of the dry meal, the mixture being heated to about 35° centigrade and held at such temperature for about twenty-four hours and thereafter cooled to produce as final product a free flowing powder.

References Cited by the Examiner

UNITED STATES PATENTS

| | | | |
|---|---|---|---|
| 341,072 | 5/86 | Stanford | 260—209.6 |
| 2,128,551 | 8/38 | Le Gloahec et al. | 260—209.6 |

OTHER REFERENCES

Bashford et al., "Jour. Soc. Chem. Ind.," vol. 69, 260–209.6, November 1950, pages 337 to 342.

WILLIAM H. SHORT, *Primary Examiner*.

ABRAHAM H. WINKELSTEIN, *Examiner*.